April 26, 1927. 1,626,524
P. GEDIEN ET AL
DEVICE FOR THE ELECTRICAL WELDING OF SEAMED TUBES
Filed Oct. 28, 1926
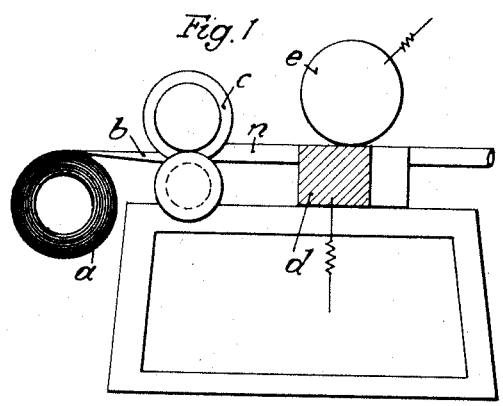
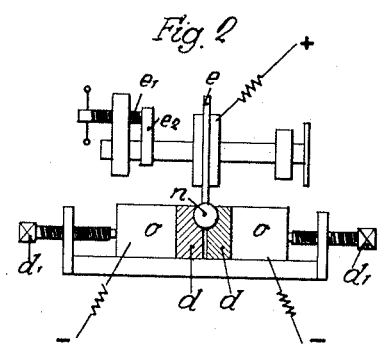
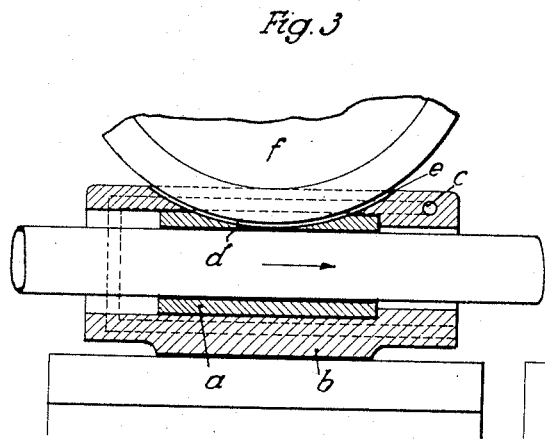
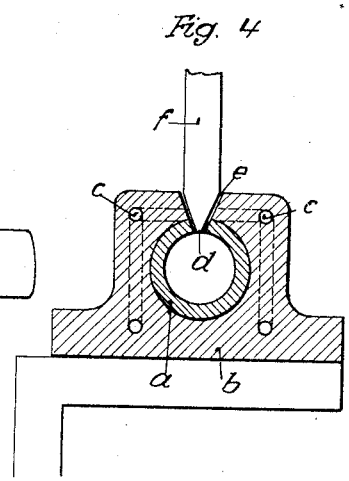
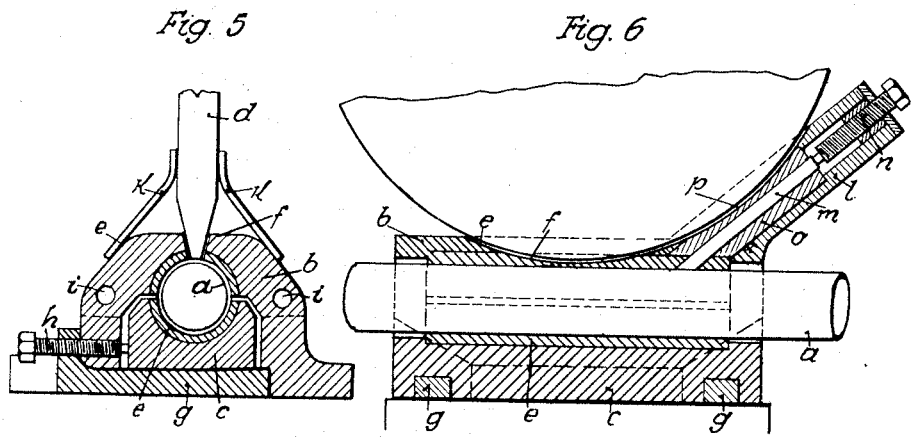
INVENTORS:
Paul Gedien
Karl Schwade
BY: Ruegg, Bayes & Bakelar
ATTORNEYS.

Patented Apr. 26, 1927.

1,626,524

UNITED STATES PATENT OFFICE.

PAUL GEDIEN, OF COLOGNE-BRAUNSFELD, AND KARL SCHWADE, OF COLOGNE-LINDENTHAL, GERMANY.

DEVICE FOR THE ELECTRICAL WELDING OF SEAMED TUBES.

Application filed October 28, 1926, Serial No. 144,900, and in Germany October 30, 1923.

This invention concerns improvements in or relating to devices for the electrical welding of tubes which are bent up from a metal band or sheet-metal strip.

In such welding it is essential that the sides of the seam along the tube should be pressed together very powerfully and that the tube should be carefully guided since electrical resistance-welding is only effective within the area directly in contact with the electrode and, consequently, the slightest deflection of the seam during the feed movement will cause faulty places in the weld.

It has been proposed hitherto that the above mentioned requirements should be met by pressing the sides of the seam together by means of resilient rollers or cheeks. This proposal, however, was impracticable because the pressure was not sufficient and displacement of the seam occured very frequently during the forward movement.

According to the present invention the edges of a tube bent up from sheet metal strip are welded directly together in a continuous operation during the passage of the tube through a pressure-exerting shaping member or between several such shaping members embracing the tube with the exception of where the electrode passes to the welding point. The frictional resistance experienced by the tube may be overcome by utilizing the forward push exerted by the shaping rollers in bending the metal together or by employing some other separate pushing or drawing device.

Various modifications of the invention are illustrated by way of example in the accompanying drawings in which:

Figs. 1 and 2 show diagrammatically one modification in side and end elevation respectively.

Figs. 3 and 4 are a longitudinal and cross section respectively to a larger scale of a second modification and Figs. 5 and 6 illustrate a further construction in cross section and longitudinal section respectively.

Referring to Figs. 1 and 2 of the drawings, in which the first modification is illustrated, the metal strip $b$ unwound from a roller $a$ is bent up to form a tube $n$ with the seam situated at the top by the shaping rollers $c$ which are of suitable profile. The electrical welding device is disposed immediately behind the last shaping roller and consists of two pressure-exerting cheeks $d$ embracing the tube and an electrode roller $e$ running on the seam. The cheeks $d$ are pressed with considerable pressure towards one another by means of the screws $d_1$ so that they maintain the tube straight and press together the edges of the seam. The said cheeks are shaped to embrace the tube almost completely and their upper edges extend almost to the welding point. The passage of the tube between the cheeks, which also serve to carry the current, is effected by the tangential force exerted thereon by the shaping rollers $c$, whereby the tube is given a feed speed which remains exactly constant.

The cheeks have the advantage that the tube is enclosed over a greater length than hitherto and is embraced radially almost to the welding point. Consequently the wall of the tube offers a very slight resistance only to the current which is conducted to the cheeks $d$ across a large contact surface. The welding point itself only is heated and a considerable economy in current consumption is thus effected. The sides of the seam are guided by the pressure-exerting cheeks surrounding the tube over a considerable length up to and beyond the welding point so that they remain positively pressed together up to and beyond the said point. It is thus possible for the welding to continue throughout the length of the cheeks.

It is preferable to make the electrode roller adjustable, during operation, transversely to the tube since it is only possible to judge at what point the electrode will weld after the welding has begun. In order therefore to enable the roller to be adjusted laterally in accordance with the course of the seam in the tube an arm $e_2$ laterally adjustable by means of a regulating screw $e_1$ (Fig. 2) is provided, the said arm being adapted to engage in a groove in the spindle of the electrode roller so that by rotating the screw $e_1$ the circular electrode $e$ may be displaced to the right or left transversely to the tube and may thus be adjusted very exactly relatively to the seam therein. Preferably not only the slides $o$ and cheeks $d$ but also the electrode are supplied with water in order to keep the said electrode cool. The cheeks either consist of a material different from that of the tube to be welded or at least of different hardness therefrom in order to avoid harmful wear during the passage of the tube.

In the second modification (Figs. 3 and 4) a sleeve $a$ which is secured in a body $b$ and through which the tube to be welded is drawn is employed in place of the cheeks. The sleeve $a$ and the body $b$ in which it is mounted each have a segmental slot, $d$, $e$, respectively, extending in the longitudinal direction and registering with each other. The electrode roller $f$ projects through these slots to the seam being welded. The supporting member and the sleeve are preferably cooled on the outside by means, for example, of suitable oil during the welding operation. The sleeve $a$ may if necessary consist of two or more parts. In this modification it is quite impossible for the edges of the tube to be welded to be displaced relatively to one another for, since the sleeve $a$ is completely closed around its circumference at the forward and rear ends, the two sides of the seam to be welded are held together very precisely and, moreover, a clenching pressure is caused which compresses the welded joint.

It is, however, difficult to keep this clenching pressure uniform since the diameter of the tube to be welded always exhibits slight differences caused by unavoidable differences in the thickness of the metal strip. These irregularities are increased still more by the natural obstruction offered by the members effecting the clenching action.

These deficiencies are obviated in the construction illustrated in Figs. 5 and 6. The tube $a$ to be welded is drawn or pressed between complementary pressure-exerting members such as a casing $b$ and a bar $c$. Each of these two parts $b$—$c$ surrounds the tube $a$ to be welded around half its circumference. The casing $b$ is connected to one of the terminals of the source of current and the electrode roller $d$ to the other terminal thereof. The members $b$ and $c$ exerting the clenching pressure on the tube are provided with linings $e$. The casing $b$ and its lining $e$ are provided with a suitably shaped slot $f$ through which the electrode roller $d$ projects to the seam being welded. The bar $c$ rests on two wedges $g$ which can each be adjusted in the casing $b$ by means of a screw $h$ engaging in the said casing. A very fine adjustment of the clenching pressure exerted by the bar $c$ is thus provided. Cooling passages $i$ through which cooling water is passed continuously may be arranged in the casing $b$. Packing pieces $k$ of asbestos or the like are preferably arranged to bear tightly on the side surfaces of the electrode roller and prevent the entry of air to the welding point so that the welding process is effected under the exclusion of air.

Immediately beyond the electrode roller a further pressure-exerting member $m$ is arranged in an extension $l$ of the casing. This member is pressed by means of a regulating screw $n$ or the like against the seam welded by the electrode roller. By this means the welded seam is subjected to a further pressure which is uniform and is made perfectly smooth. Minute adjustment of the pressure can be effected by means of the regulating screw $n$. The member $m$ which is made of material adapted to resist the stresses set up during the clenching and smoothing of the welded seam is guided in a bush $o$. The extension $l$ on the casing and the bush $o$ are provided with a recess $p$ into which the electrode roller $d$ projects. If the bush $o$ is of iron it becomes, due to its situation in the inductive field, strongly magnetized and, therefore, attracts any iron particles adhering to the electrode roller $d$. In this manner the electrode roller is always kept clean which is most important for efficient operation.

We claim:—

1. A device for the continuous electrical welding of seamed tubes, comprising in combination separate adjustable complementary pressure exerting members for bringing together the edges of the tube, a rotary welding electrode and means for advancing the tube between the said members, said members between them embracing the tube except for a slot provided for the passage of the electrode.

2. A device for the electrical welding of seamed tubes, comprising in combination a lined pressure exerting device for bringing together the edges of the seam, a welding electrode and means for advancing the tube through the pressure exerting means, the said pressure exerting means embracing the tube except where the electrode passes to the welding point.

3. A device for the electrical welding of seamed tubes, comprising in combination pressure exerting means for bringing together the edges of the seam, a rotary welding electrode, an auxiliary pressure exerting member adapted to act on the welded seam, an iron guide or mounting, for the said auxiliary pressure exerting device, said mounting due to its position in the magnetic field of the welding current being caused to attract any iron particles adhering to the electrode and means for advancing the tube through the pressure exerting means which embrace the tube except where the electrode passes to the welding point.

In testimony whereof we have signed our names to this specification.

PAUL GEDIEN.
KARL SCHWADE.